(12) United States Patent
Yu et al.

(10) Patent No.: US 11,202,042 B2
(45) Date of Patent: Dec. 14, 2021

(54) DISPLAY APPARATUS

(71) Applicant: Appotronics Corporation Limited, Shenzhen (CN)

(72) Inventors: Xin Yu, Shenzhen (CN); Fei Hu, Shenzhen (CN); Zu-Qiang Guo, Shenzhen (CN); Yi Li, Shenzhen (CN)

(73) Assignee: Appotronics Corporation Limited, Shenzhen (CN)

( * ) Notice: Subject to any disclaimer, the term of this patent is extended or adjusted under 35 U.S.C. 154(b) by 0 days.

(21) Appl. No.: 16/981,389

(22) PCT Filed: Nov. 5, 2018

(86) PCT No.: PCT/CN2018/113892
§ 371 (c)(1),
(2) Date: Dec. 4, 2020

(87) PCT Pub. No.: WO2019/174275
PCT Pub. Date: Sep. 19, 2019

(65) Prior Publication Data
US 2021/0092333 A1  Mar. 25, 2021

(30) Foreign Application Priority Data
Mar. 16, 2018 (CN) .......... 201810219898.X (51) Int. Cl.
*H04N 9/31* (2006.01)
(52) U.S. Cl.
CPC ......... *H04N 9/3105* (2013.01); *H04N 9/3161* (2013.01); *H04N 9/3164* (2013.01); *H04N 9/3182* (2013.01)

(58) Field of Classification Search
CPC .... G03B 21/006; G03B 21/008; G03B 21/16; G03B 21/28; G03B 21/58; G03B 21/204; G03B 21/208; G03B 21/2013; G03B 21/2033; G03B 21/2053; H04N 9/31; H04N 9/3105; H04N 9/3155; H04N 9/3161; H04N 9/3164; H04N 9/3182; G09G 3/006; G09G 3/007; G09G 3/008; G09G 3/02; G09G 3/03; G09G 3/04; G09G 3/20
See application file for complete search history.

(56) References Cited

U.S. PATENT DOCUMENTS

2014/0292834 A1* 10/2014 Ando ................ G09G 3/20
 345/690
2018/0164667 A1*  6/2018 Wang ............... G03B 21/204
2018/0348575 A1* 12/2018 Shao ............... G02F 1/133603

* cited by examiner

*Primary Examiner* — Sultan Chowdhury
(74) *Attorney, Agent, or Firm* — ScienBiziP, P.C.

(57) ABSTRACT

A display apparatus comprising a light source device, an image data processing module, a light modulation device, and an image synthesizing device. The light source device is configured to emit first light and second light. The image data processing module is configured to receive original image data of an image to be displayed, the original image data of the image to be displayed being image data based on a second color gamut range and comprising original control signal values of m colors of pixels, and the second color gamut range covers a first color gamut range and has a portion beyond the first color gamut range. The image data processing module further maps the original control signal values as m corrected control signal values and n control signal values.

12 Claims, 9 Drawing Sheets

DISPLAY APPARATUS

TECHNICAL FIELD

The present disclosure relates to the field of display technology, and particularly to a display apparatus.

BACKGROUND

A color gamut usually refers to spectrum locus of visible light that human eyes can see in nature. An area of a region formed by the spectrum locus of the visible light is the maximum color gamut area that human eyes can see. Currently, display devices composed of different display components, such as projectors and display panels, all use three primary colors of R, G, and B to reproduce or represent the colors of images. In a specified chromaticity space, such as chromaticity space CIE1931xy, a triangle formed by spectrum locus of the three primary colors of R, G, and B of the display device is called a color gamut that the device can display. The larger an area of the color gamut space, the brighter and more realistic the colors of the reproduced image that people can feel. However, how to enable the display devices to achieve a wider color gamut is an important technical issue in the field.

SUMMARY

In view of the above, the present disclosure intends to provide a display apparatus with a wide color gamut.

A display apparatus, comprising:

a light source device configured to emit first light and second light, wherein the first light is configured to be modulated to form images within a first color gamut range, the second light is configured to cooperate with the first light to be modulated to jointly form images outside the first color gamut range, and the first light comprises light of m colors, the second light comprises light of n colors out of the m colors, wherein m is greater than or equal to n;

an image data processing module configured to receive original image data of an image to be displayed, wherein the original image data of the image to be displayed is based on image data within a second color gamut range and comprises original control signal values of the m colors of each pixel, and the second color gamut range covers the first color gamut range and has a portion that exceeds the first color gamut range, and wherein the image data processing module is further configured to map the original control signal values of the m colors of each pixel of the original image data of the image to be displayed into corrected control signal values of m+n colors, so as to obtain corrected image data of the image to be displayed, wherein the corrected control signal values of m+n colors of each pixel in the corrected image data comprises m+n corrected control signal values corresponding to the m colors of lights of the first light and n colors of lights in the second light;

a first spatial light modulator configured to generate first image light by modulating the corresponding color light in the first light and the second light based on k corrected control values of m+n corrected control signal values of each pixel of the corrected image data, wherein k is smaller than m+n; and a second spatial light modulator configured to generate second image light by modulating the corresponding color light in the first light and the second light based on m+n−k corrected control values other than k corrected control values in the m+n corrected control signal values of each pixel of the corrected image data.

Compared with the prior arts, in the display apparatus of the present disclosure, the second light is added, and the original image data of the image is converted into m corrected control signal values and n corrected control signal values corresponding to the first light and the second light, respectively, and the first light and the second light are modulated based on the m+n corrected control signal values to obtain image light, and a display of image data with a wide color gamut thereby can be realized, and an accurate restoration of displayed images can be ensured. The display apparatus has a wider color gamut and a better display effect.

| DESCRIPTION OF SYMBOLS OF MAIN COMPONENTS | |
|---|---|
| Display apparatus | 600 |
| Light source device | 610 |
| Image data processing module | 620 |
| Light modulating device | 630 |
| First light source | 611 |
| Second light source | 612 |
| Excitation light source | 613 |
| Wavelength conversion device | 614 |
| Laser light source | 615, 616 |
| Light-combing element | 617 |
| First light-combining element | 617a |
| Second light-combining element | 617b |
| Third light-combining element | 617c |
| Light-splitting device | 618 |
| light-splitting element | 618a |
| First guiding element | 618b |
| Second guiding element | 618c |
| First area | 617d |
| Second area | 617e |

-continued

| DESCRIPTION OF SYMBOLS OF MAIN COMPONENTS | |
| --- | --- |
| First segmented area | 614a |
| Second segmented area | 614b |
| Third segmented area | 614c |
| Lens | 619 |
| First spatial light modulator | 631 |
| Second spatial light modulator | 632 |
| Image synthesizing device | 640 |
| First color gamut range | F1 |
| Second color gamut range | F2 |

The following specific embodiments will further illustrate the present disclosure in conjunction with the above drawings.

DETAILED DESCRIPTION

Figure 1:
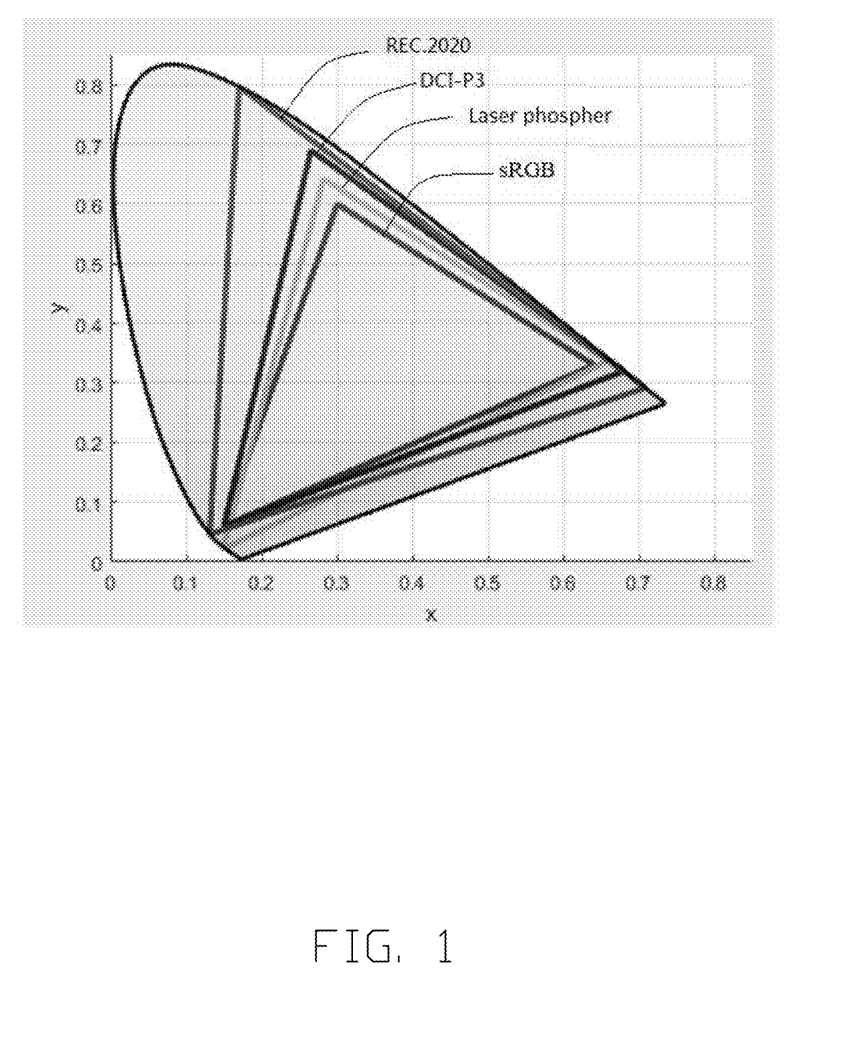
FIG. 1 is a comparison diagram of color gamut of a plurality of display apparatuses adopting different light sources.

Light sources of display apparatuses such as laser projectors are generally divided into three categories. One category excites phosphors of different colors using short-wavelength laser light to produce lights of primary colors of red, green, and blue. Another category directly uses red, green, and blue laser lights as light sources of three primary colors. The third category is a combination of aforementioned two categories, and generally uses a blue laser light source as a short-wavelength excitation light source to excite a phosphor to produce red and green primary lights, and the blue laser light source itself as blue primary light. These three different implementation technologies have their own advantages and disadvantages. For the scheme of laser light exciting phosphors or the scheme of laser light combined with fluorescence, semiconductor blue laser with a gallium nitride substrate has characteristics of high efficiency, long life, and stable equipment, thereby the scheme of exciting a phosphor wheel by the blue semiconductor laser has characteristics of high efficiency, long life, stable equipment, and low cost. However, due to a wide spectrum of fluorescence of excited phosphors (Laser phosphors), a color gamut of this scheme is relatively narrow. Generally, display apparatuses using this scheme can cover a complete sRGB color gamut, and the color gamut of such devices can be enhanced to reach the DCI-P3 color gamut through some enhancement processes, such as adding a narrowband optical filter to remove yellow light spectrum in green and red lights. However, narrowband filtering will lose considerable brightness, which greatly reduces an efficiency of the display apparatuses. Display apparatuses using pure RGB laser lights have a very wide color gamut because the RGB laser light have good monochromaticities. Display apparatuses using RGB laser light (such as projection systems) can easily reach the standard REC2020 color gamut. The comparison of color gamut of the above-mentioned display apparatuses is shown in FIG. 1.

However, there are many disadvantages of RGB laser light display apparatuses (such as projectors). The first disadvantage lies in the speckle. The speckle is caused by the coherence of the laser light, which causes lights reflected by a display plane to interfere because of phase differences caused by a fluctuation of the plane, resulting in uneven brightness distribution in a displayed image. Although there are many disclosures that try to solve the problem of laser light speckle, the effect is not satisfactory. A second disadvantage lies in a high cost of RGB laser light display apparatus. This is because technical solutions of the red and green laser lights in the RGB laser light display apparatus are not mature under current technology. An efficiency of a semiconductor green laser is only 20% or less at present, which is far lower than blue lasers with gallium nitride substrates and red lasers with ternary substrates, and the cost is very high. Although an efficiency of the red laser may be similar to that of the blue laser, a temperature stability of the red laser is poor. With an increased temperature, not only the efficiency decreases significantly, but also a center wavelength shifts. These two points cause a color shift to occur in RGB laser light display apparatuses as the temperature changes. This requires adding a constant temperature device to the red laser to stabilize a working state of the red laser, which also means that a high-power cooling device is required to ensure a stable working temperature of the red laser, which greatly increases a cost of the RGB laser light display apparatus.

Figure 2:
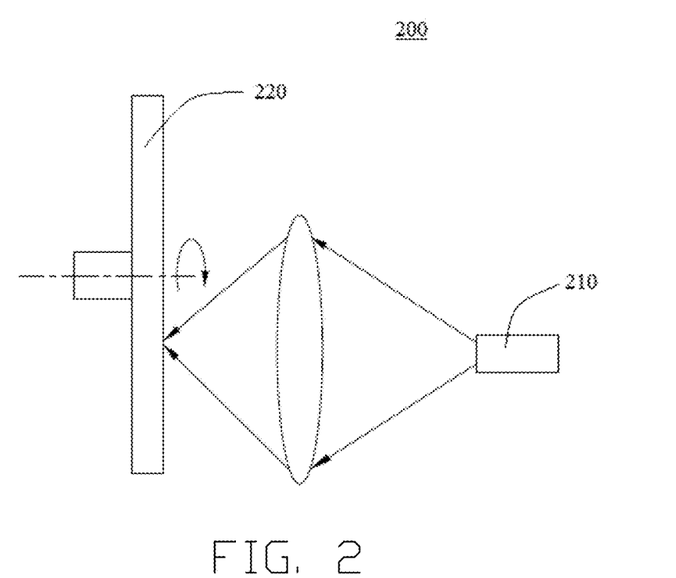
FIG. 2 is a schematic diagram of a structure of a light source of a display apparatus.
Figure 3:
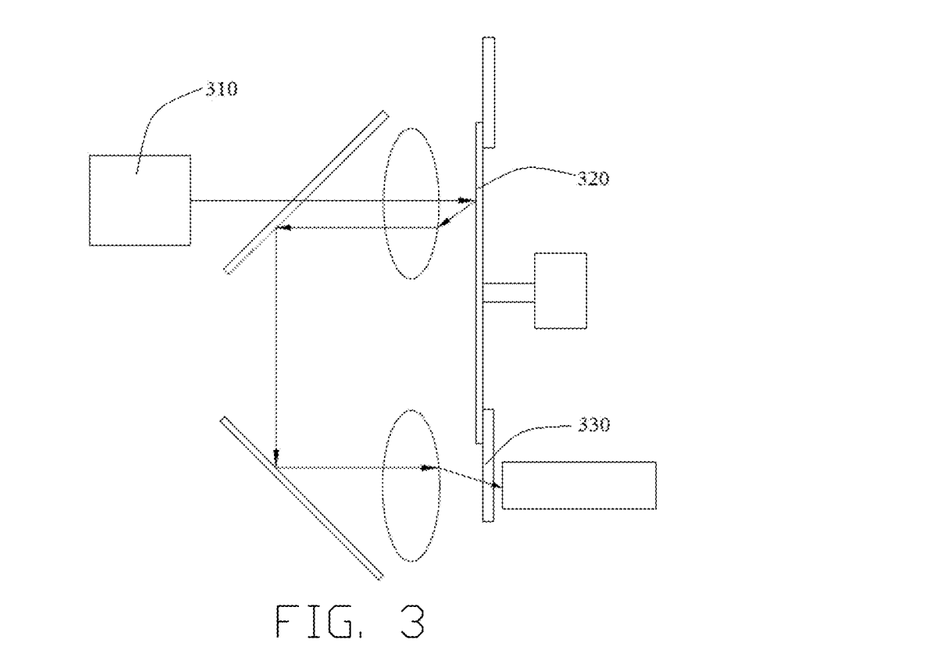
FIG. 3 is a schematic diagram of a structure of a light source of another display apparatus.

A basic light source 200 with a phosphor wheel excited by laser light is shown in FIG. 2, in which short-wavelength visible light emitted from an excitation light source 210 excites a phosphor on a color wheel 220 to generate primary color light or white light in a time sequence. Due to a wide spectrum of the fluorescence, a color gamut coverage based on this system is relatively narrow. An improved method of enhancing a color gamut is shown in FIG. 3. The short-wavelength visible light emitted from the excitation light source 310 is converted into primary color light by a color wheel 320 and filtered by a synchronous filter 330 to obtain primary color light having a narrowband and higher purity, to expand the color gamut of the laser fluorescence. The filter will bring additional loss of optical power, which reduces an efficiency of the display apparatus.

Figure 4A:
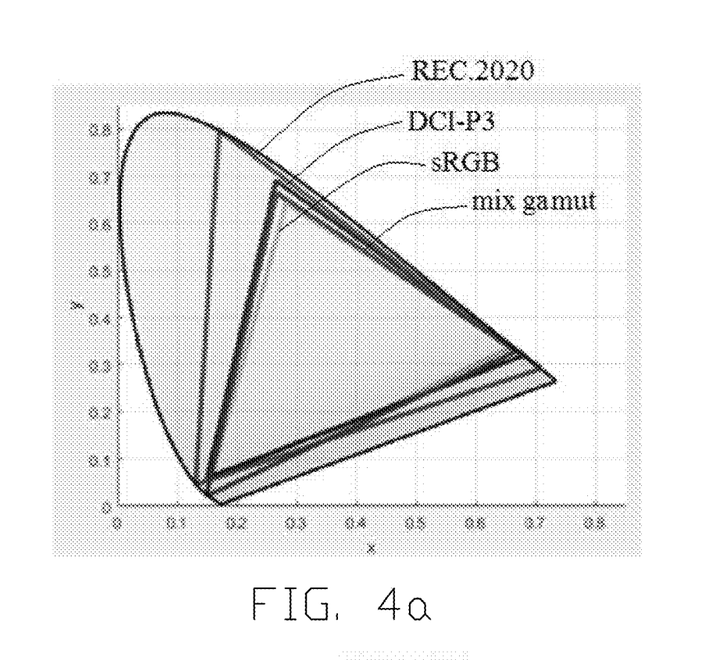
FIG. 4a and FIG. 4b are schematic diagrams showing color gamut ranges that the display apparatuses respectively shown in FIG. 2 and FIG. 3 achieve by adding pure-colored laser light of different proportions.
Figure 4B:
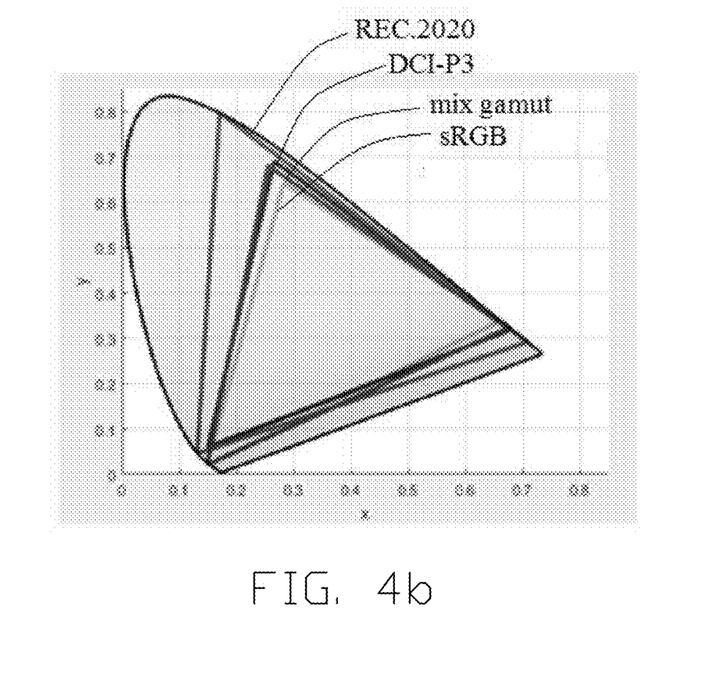

A color gamut of a light source can also be expanded by adding pure red or green laser light to the laser fluorescence. For example, a scheme proposed in one technology in which pure-colored laser light can be added into a laser-phosphor system, and a scheme proposed in another technology in which one or two optical paths are added, and so on. Although the color gamut of laser-fluorescence can be expanded by adding pure-colored laser light, there is no modulation of a ratio of light sources based on content to be displayed, and the range of the color gamut that can be enhanced is limited. As shown in FIGS. 4a and 4b, on basis of a mixed gamut obtained by adding pure laser light (as shown in FIG. 4a) whose brightness is 20% of the fluorescence, it is necessary to add pure-colored laser light (as shown in FIG. 4b) with a brightness equivalent to 40% of the fluorescence to form a mixed light if the color gamut of the laser fluorescence needs to be extended to the standard of DCI-P3. Compared with the scheme of fluorescence plus a filter, the display apparatus adopting this scheme is more efficient, but high-power red and green lasers are needed, which leads to an increase in the system cost.

Figure 5A:
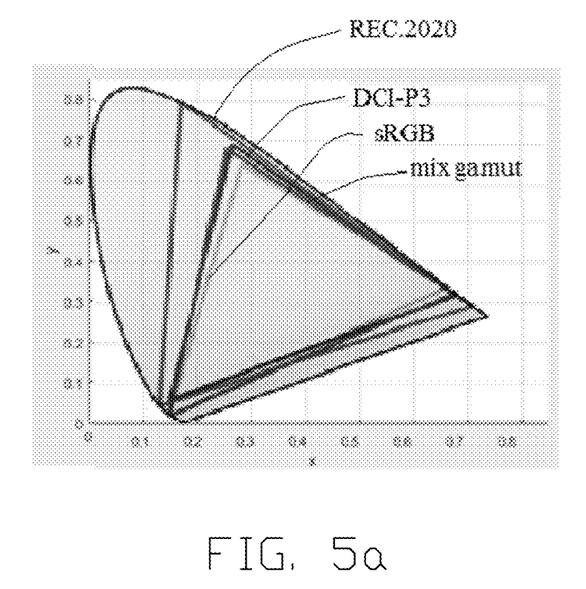
FIG. 5a and FIG. 5b are schematic diagrams of color gamut ranges achieved by a display apparatus adopting a dynamic color gamut.
Figure 5B:
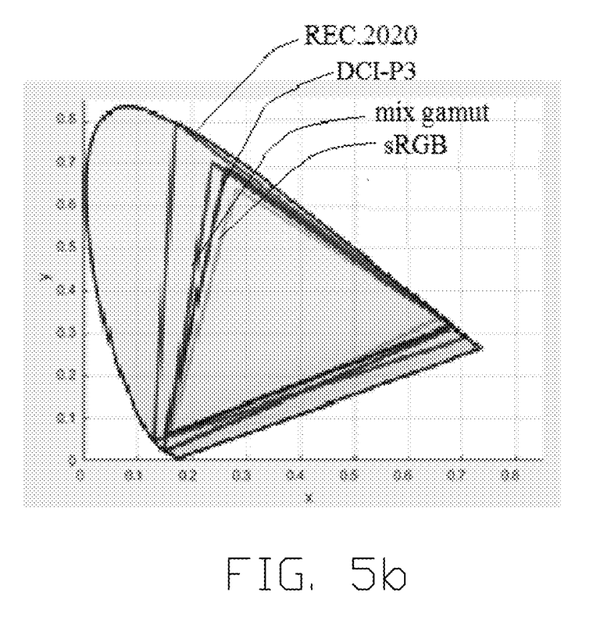

In addition, a display apparatus adopting a dynamic color gamut that analyzes images and thereby dynamically adjusts brightness of laser light and fluorescence can also increase the system efficiency. The image always has a certain brightness, and the fluorescence and laser light are combined in front of a spatial light modulator to form a three-primary color system, wherein a blue primary color comes from blue laser light, a green primary color comes from green fluorescence and green laser light combined based on a ratio provided by a dynamic control signal, and a red primary color comes from red fluorescence and red laser light which are combined based on a ratio. In this method of a dynamic color gamut, the brightness of the fluorescence cannot be completely turned off, and thus the color gamut of the standard of Rec.2020 cannot be fully achieved with this method of a dynamic color gamut. This is because the maximum brightness of the image is usually not zero, and an intensity of the fluorescence is set based on the maximum brightness of the image, and bright-field information of the image usually contains a large amount of white light components. Please refer to FIGS. 5a and 5b are schematic diagrams of color gamut ranges that a display apparatus using the dynamic color gamut can achieve, wherein FIG. 5a is a schematic diagram of a color gamut range that can be achieved by adding red and green laser lights with a proportion of 20% to the fluorescence, and FIG. 5b is a schematic diagram of a color gamut range that can be achieved by adding red and green laser lights with a proportion of 40% to the fluorescence. It can be seen that it is difficult to fully reach the color gamut range of the standard of Rec.2020 in both FIG. 5a and FIG. 5b.

Figure 6:
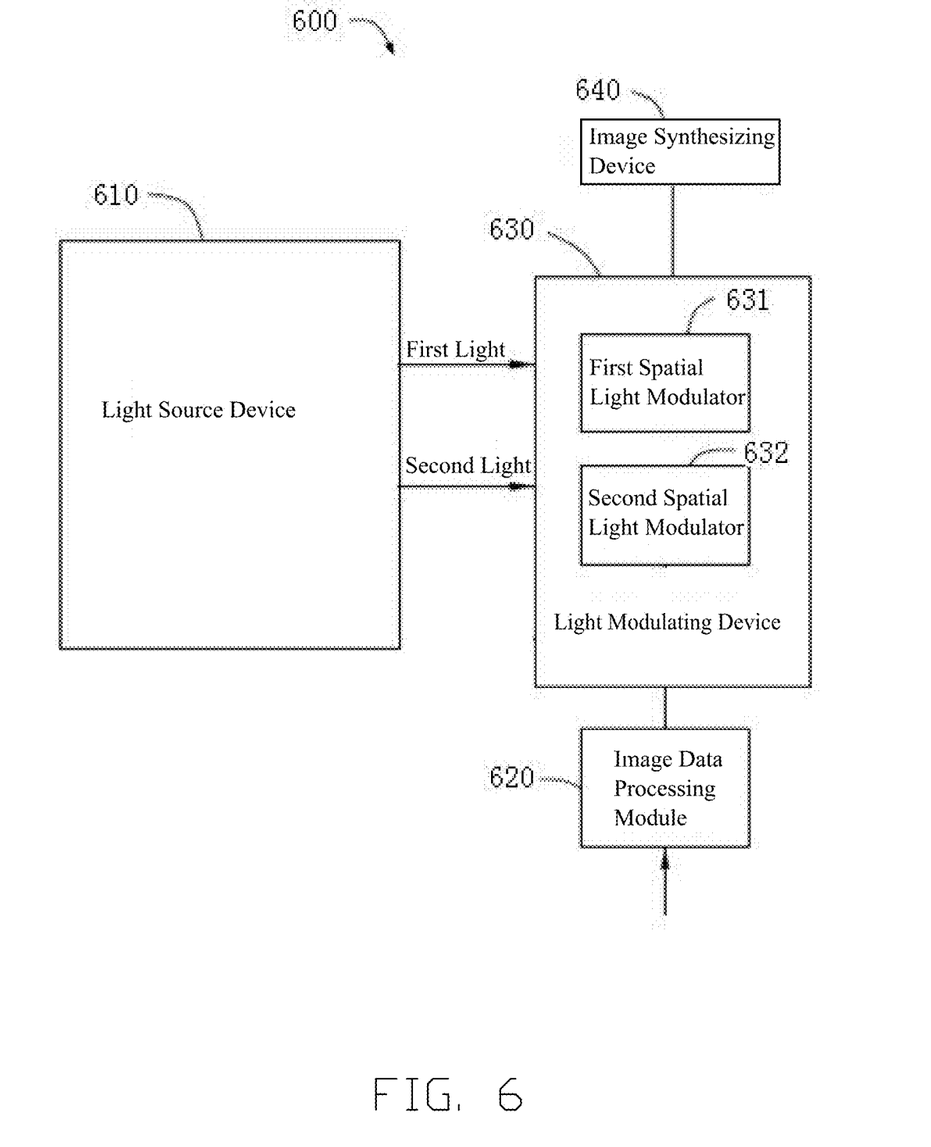
FIG. 6 is a block diagram of a display apparatus based on an embodiment of the present disclosure.

Please refer to FIG. 6, which is a block diagram of a display apparatus 600 based on a an embodiment of the present disclosure. The display apparatus 600 includes a light source device 610, an image data processing module 620, a light modulating device 630, and an image synthesizing device 640.

The light source device 610 is configured to emit a first light and a second light, wherein the first light is configured to be modulated to form images in a first color gamut range F1, the second light is configured to cooperate with the first light to jointly be modulated to form images outside the first color gamut range F1, the first light includes light of m colors, and the second light includes light of n colors in the light of m colors, and m is greater than or equal to n. Specifically, the first light may also include fluorescence, m may be 3, and the first light may include light of three primary colors, such as red, green, and blue lights. In the first light, the blue light may be laser light, and the green light and the red light are both fluorescence, which may be generated by exciting fluorescent material (such as red fluorescent material and green fluorescent material; or yellow fluorescent material) with the blue laser light. The second light may include red light and green light, the red light and the green light may both be laser lights, that is, n may be 2, and the lights of the two colors of the second light may be red laser light and green laser light, respectively.

Figure 7:
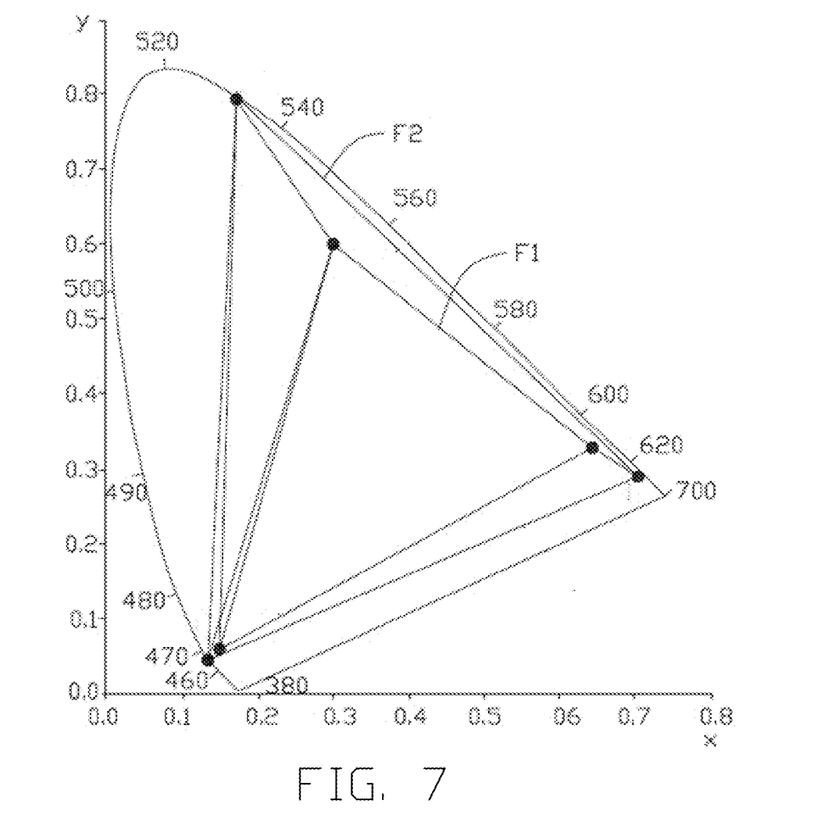
FIG. 7 is a schematic diagram of the color gamut range of the display apparatus shown in FIG. 6.

It should be understood that, as mentioned above, a color gamut range that the first light can render is the first color gamut range F1. As shown in FIG. 7, the first color gamut range F1 may be the color gamut range of DCI, such as color gamut range DCI-P3. Thus, if an image to be displayed is in the first color gamut range F1, the amount of the second light can be zero, and an image in the first color gamut range F1 may be displayed by only modulating the first light. Further, since in the first light, the red light and the green light are fluorescence and the second light includes the red laser light and the green laser light, the laser lights in the second light can render a wider color gamut range than that of the fluorescence in the first light. Specifically, the first light and the second light can jointly render images beyond the first color gamut range. Specifically, images with a color gamut on the boundary line of the second color gamut range F2 (the amount of the red or green fluorescence in the first light can be zero) can be rendered by modulating the blue laser light in the first light and the red and green laser lights in the second light, wherein the second color gamut range F2 covers the first color gamut range F1 and has a part that exceeds the first color gamut range F1. The second color gamut range F2 may be a REC color gamut range, such as a color gamut range REC.2020. Further, for an image with a color gamut on the boundary line of the first color gamut range F1 and the boundary line of the second color gamut range F2, it can be jointly rendered by modulating the blue laser light, the red and green fluorescence in the first light and the red and green laser lights in the second light, wherein the amount of each of the blue laser light, the red or green fluorescence in the first light and the red or green laser light in the second light can be not zero.

The image data processing module 620 is configured to receive original image data of an image to be displayed. The original image data of the image to be displayed is based on image data of the second color gamut range F2 and includes original control signal values of the m colors of each pixel. The image data processing module 620 is also configured to map the original control signal values of the m colors of each pixel of the original image data of the image to be displayed into corrected control signal values of m+n colors to obtain corrected image data of the image to be displayed. Specifically, in the corrected image data, the corrected control signal values of the m+n colors of each pixel include m corrected control signal values corresponding to the first light and n corrected control signals corresponding to the second light.

First of all, it can be understood that the original image data can adopt different encoding formats such as RGB encoding and YUV encoding, wherein different encoding formats can correspond to different color spaces. In this embodiment, the corrected control signal values are calculated mainly by converting the original image data into tristimulus values X, Y, and Z of a color space defined by color gamut coordinates xyY under the standard of CIE 1937. Specifically, the CIE 1937 defines absolute colors that any human eye can distinguish and brightness of the colors with a three-dimensional vector, which do not change with the color gamut. Thus, it can be based on a principle as that the tristimulus values X, Y, and Z of the pixel calculated based on the original control signal values of the pixel are respectively equal to the tristimulus values X, Y, and Z of the pixel calculated based on the first corrected control signal value and the second corrected control signal value of the pixel, that based on the original control signal values of each pixel, the first corrected control signal value and the second corrected control signal value of each pixel can be calculated.

For example, assuming that original control signal values of m colors of each pixel are R, G, and B, m corrected control signal values are r, g, and b, n corrected control signal values are rl, gl, based on a principle that the tristimulus values X, Y, and Z of the pixel calculated based on the original control signal values R, G, and B of the pixel equal to the tristimulus values X, Y, and Z of the pixel calculated based on the first corrected control signal values and the second corrected control signal values of the pixel, the image data processing module maps the original control signal values R, G, and B of each color of the original image data of the image to corrected control signal values r, g, b, rl, and gl of the m+n colors so as to obtain the corrected image data of the image to be displayed.

The original control signal values R, G, B are known in a mapping process of converting the original control signal values R, G, and B into the corrected control signal values r, g, b, rl, and gl, and countless solutions of r, g, b, rl, and gl can be obtained through a mapping formula of the tristimulus values. At this time, values of the r, g, b, rl, and gl are selected as the corrected control values r, g, b, rl, and gl in such a manner that a value of rl2+gl2 is the smallest, so as to obtain the most suitable r, g, b, rl, and gl on the basis of ensuring the r, g, b, rl, and gl are all in a grayscale range of 0 to M that can be displayed by the display apparatus. At the same time, it can be ensured that the rl and gl corresponding to the second light are small since the rl2+gl2 is the smallest, so that the least second light is used to display the color gamut of the image, which not only reproduces the image accurately, but also reduces the second light, thereby reducing a cost of the light source.

In the following, it is described in detail as to how to obtain the corresponding corrected control signal values r, g, b, and rl based on the original control signal values R, G, and B of the m colors of each pixel when the original image data is in the RGB encoding format. Specifically, the original control signal values R, G, and B are red original grayscale value R, green original grayscale value G, and blue original grayscale value B, respectively, when the original image data is in the RGB encoding format and the m colors are three primary colors of red, green and blue. The first corrected control signal values r, g, and b are a first red corrected grayscale value r corresponding to the red fluorescence in the first light, a first green corrected grayscale value g corresponding to the green fluorescence in the first light, and a first blue corrected grayscale value b corresponding to the blue laser light in the first light, respectively. The second corrected control signal values rl and gl are a second red corrected grayscale value rl corresponding to the red laser light in the second light and a second green corrected grayscale value gl corresponding to the green laser light in the second light, respectively. Further, in the display apparatus, original grayscale values R, G, B and the corrected grayscale values r, g, b, rl and gl may all adopt a binary encoding format, such as a N-bit binary encoding, then a gray level M of each color that can be displayed by the display apparatus corresponds to the bit number N of the binary code. That is, the original gray level values R, G, B and the corrected grayscale values r, g, b, rl and gl are all in a range of [0 to M], wherein M=2N−1. For example, when N=8, the number of grayscale levels of the display apparatus are 256, the original grayscale values R, G, B and the corrected grayscale values r, g, b, rl, and gl are all in a range of [0 to 255], wherein the grayscale value 0 means that the color is completely turned off, and a grayscale value 255 means that the color is displayed at the highest brightness.

Further, the three primary colors of RGB vary as color gamut ranges of the original image data change. In this embodiment, the original image data is in the second color gamut range F2, and it is assumed that color gamut coordinates xyY in the CIE 1937 color space of colors and brightness of the three primary colors r0, g0, and b0 in the second color gamut range F2 satisfy the following formula 1.

$$\begin{bmatrix} r_0 \\ g_0 \\ b_0 \end{bmatrix} = \begin{bmatrix} x_r & y_r & Y_r \\ x_g & y_g & Y_g \\ x_b & y_b & Y_b \end{bmatrix}$$ (Formula 1)

It should be understood that for the original image data, the second color gamut range F2 is known, so the color gamut coordinates xyY of r0, g0, and b0 are also known. The color gamut coordinates xyY are (0.708, 0.292, 0.2627), (0.17, 0.797, 0.6780), and (0.131, 0.046, 0.0593) in the CIE 1937 color space when the second color gamut range is the REC 2020 color gamut range.

Further, the tristimulus values (X, Y, Z) satisfy the following formula 2 when the tristimulus values (X, Y, Z) are calculated by converting the original grayscale values (R, G, B) of each color of each pixel to the CIE 1937 color space.

$$\begin{bmatrix} X \\ Y \\ Z \end{bmatrix} = C \begin{bmatrix} R \\ G \\ B \end{bmatrix} / M$$ (Formula 2)

Wherein, in Formula 2, as mentioned above, M is the gray level of the display apparatus. Further, based on the xyY color gamut coordinates of the three primary colors r0, g0, and b0 in the second color gamut range (see formula 1), it can be known that the matrix C satisfies the following formula 3.

$$C = \begin{bmatrix} \frac{x_r}{y_r} Y_r & \frac{x_g}{y_g} Y_g & \frac{x_b}{y_b} Y_b \\ Y_r & Y_g & Y_b \\ \frac{1-x_r-y_r}{y_r} Y_r & \frac{1-x_g-y_g}{y_g} Y_g & \frac{1-x_b-y_b}{y_b} Y_b \end{bmatrix}$$ (Formula 3)

Further, since the display apparatus of the present disclosure uses a five-primary-color system with lights of m colors in the first light and lights of n colors in the second light, the five primary colors r0, g0, b, rl0, and gl0 represent color and brightness of red fluorescence in the first light, green fluorescence in the first light, blue laser light in the first light, the red laser light in the second light, and the green laser light in the second light, respectively. The xyY color gamut coordinates of the five primary colors r0, g0, b0, r0, and gl0 in the CIE 1937 color space satisfy the following formula 4.

$$\begin{bmatrix} r_0 \\ g_0 \\ b_0 \\ rl_0 \\ gl_0 \end{bmatrix} = \begin{bmatrix} x_r & y_r & Y_r \\ x_g & y_g & Y_g \\ x_b & y_b & Y_b \\ x_{rl} & y_{rl} & Y_{rl} \\ x_{gl} & y_{gl} & Y_{gl} \end{bmatrix}$$ (Formula 4)

It should be understood that the brightness of any color in the CIE space can be formed of the five primary colors modulated based on a brightness ratio and then combined, and the five primary colors r0, g0, b0, rl0, and gl0 can also be known, such as determined based on the first light and the second light emitted from the light source device 610. Further, the corrected grayscale values r, g, b, rl, and gl satisfy the following formula 5 based on the principle that the tristimulus values X, Y, and Z of the pixel calculated based on the original gray scale values R, G, and B of each pixel equal to the tristimulus values X, Y, and Z of the pixel calculated based on the first corrected grayscale values r, g, and b and the second corrected grayscale values rl and gl.

$$\begin{bmatrix} X \\ Y \\ Z \end{bmatrix} = C' \begin{bmatrix} r \\ g \\ b \\ rl \\ gl \end{bmatrix} / M$$ (Formula 5)

Further, based on the formula 4, the conversion matrix C' satisfies the following formula 6.

$$C' = \begin{bmatrix} \frac{x_r}{y_r}Y_r & \frac{x_g}{y_g}Y_g & \frac{x_b}{y_b}Y_b & \frac{x_{rl}}{y_{rl}}Y_{rl} & \frac{x_{gl}}{y_{gl}}Y_{gl} \\ Y_r & Y_g & Y_b & Y_{rl} & Y_{gl} \\ \frac{1-x_r-y_r}{y_r}Y_r & \frac{1-x_g-y_g}{y_g}Y_g & \frac{1-x_b-x_b}{x_b}Y_b & \frac{1-x_{rl}-y_{rl}}{y_{rl}}Y_{rl} & \frac{1-x_{gl}-y_{gl}}{y_{gl}}Y_r \end{bmatrix} \quad \text{(Formula 6)}$$

The conversion matrix C' can be obtained based on the five primary colors r0, g0, b0, rl0, and g0, since the tristimulus values X, Y, Z can be calculated based on the original image data. Thus, the corrected grayscale values r, g, b, rl, and gl actually have an infinite number of solutions based on the formula 5. Additional restrictions need to be added to solve the corrected grayscale values r, g, b, rl, and gl in order to obtain unique corrected grayscale values r, g, b, rl, and gl corresponding to the five primary colors.

Specifically, in an embodiment, brightness of any two of the corrected grayscale values r, g, b, rl, and gl can be randomly designated, and then the other three corrected grayscale values can be calculated. It should be noted that a value range of the five control signals is between 0 and 255, the two randomly selected values may cause the other three values to be solved beyond the range of values, so a random selection method is not the most preferred embodiment. In another embodiment, the lowest square sum rl2+gl2 of brightness of the red and green laser lights can be minimized, that is, obtaining a solution for min(rl2+g2).

First, we can transform formula (5) into the following formula 7.

$$A\begin{bmatrix} r \\ g \\ b \\ 1 \end{bmatrix} = B\begin{bmatrix} rl \\ gl \end{bmatrix} \quad \text{(Formula 7)}$$

Wherein, parameters A and B satisfy the following formulas 8 and 9, respectively.

$$A = \begin{bmatrix} \frac{x_r}{y_r}Y_r & \frac{x_g}{y_g}Y_g & \frac{x_b}{y_b}Y_b & X \\ Y_r & Y_g & Y_b & Y \\ \frac{1-x_r-y_r}{y_r}Y_r & \frac{1-x_g-y_g}{y_g}Y_g & \frac{1-x_b-y_b}{y_b}Y_b & Z \end{bmatrix} \quad \text{(Formula 8)}$$

$$B = \begin{bmatrix} \frac{x_{rl}}{y_{rl}}Y_{rl} & \frac{x_{gl}}{y_{gl}}Y_{gl} \\ Y_{rl} & Y_{gl} \\ \frac{1-x_{rl}-y_{rl}}{y_{rl}}Y_{rl} & \frac{1-x_{gl}-y_{gl}}{y_{gl}}Y_r \end{bmatrix} \quad \text{(Formula 9)}$$

Further, formula 7 is transformed in order to solve for r, g, b, rl, and gl, and a following formula 10 can be obtained.

$$\begin{bmatrix} rl \\ gl \end{bmatrix} = (B^T B)^{-1} B^T A \begin{bmatrix} r \\ g \\ b \\ 1 \end{bmatrix} \quad \text{(Formula 10)}$$

Furthermore, in order to minimize the rl2+gl2, it need to solve min(rl² +gl²), that is, to solve $$\min\left(\left\|\begin{matrix} rl \\ gl \end{matrix}\right\|^2\right).$$

A function f(rl, gl) is defined, wherein the function f(rl, gl) satisfies the following formula 11.

$$f(rl, gl) = \left\|\begin{matrix} rl \\ gl \end{matrix}\right\|^2 \quad \text{(Formula 11)}$$

Further, the partial differential ∇f of r, g, b can be minimized to solve the function f(rl, gl), that is, the partial differential ∇f of r, g, b satisfy the following formula 12.

$$\nabla f = 0 \quad \text{(Formula 12)}$$

Furthermore, a following formula 13 can be obtained by rewriting the matrix in formula 10.

$$T = (B^T B)^{-1} B^T A = \begin{bmatrix} t_{11} & t_{12} & t_{13} & t_{14} \\ t_{21} & t_{22} & t_{23} & t_{24} \end{bmatrix} * M \quad \text{(Formula 13)}$$

The formula 12 can be rewritten as a following formula 14.

$$D\begin{bmatrix} r \\ g \\ b \end{bmatrix} / M = d \quad \text{(Formula 14)}$$

Wherein, based on the formula 13, parameters D and d satisfy the following formula 15 and formula 16, respectively.

$$D = \begin{bmatrix} t_{11}^2 + t_{21}^2 & t_{11}t_{12} + t_{21}t_{22} & t_{11}t_{13} + t_{21}t_{23} \\ t_{12}t_{11} + t_{22}t_{21} & t_{12}^2 + t_{22}^2 & t_{12}t_{13} + t_{22}t_{23} \\ t_{13}t_{11} + t_{23}t_{21} & t_{13}t_{12} + t_{23}t_{22} & t_{13}^2 + t_{23}^2 \end{bmatrix} \quad \text{(Formula 15)}$$

$$d = \begin{bmatrix} t_{11}t_{14} + t_{21}t_{24} \\ t_{11}t_{14} + t_{21}t_{24} \\ t_{11}t_{14} + t_{21}t_{24} \end{bmatrix} \quad \text{(Formula 16)}$$

The formula 13 is obtained by rewriting the matrix. Since the parameters A and B can be calculated from the color gamut coordinates xyZ of the five primary colors r0, g0, b0, rl0, and gl0 in the formula 4 and the tristimulus value XYZ in formula 2, the parameter T and its parameters t11, t12, t13, t14, t21, t22, t23, t24 can be obtained. Values of the parameters D and d can be obtained by substituting the parameters t11, t12, t13, t4, t21, t22, t23, t24 into the formula 15 and the formula 16, thereby the first corrected grayscale values r, g, and b can be obtained, and then the second corrected grayscale values rl and gl can be obtained by substituting the values of r, g, and b into the formula 7. The grayscale values of the five primary colors will go out of the range if the color brightness of the color exceeds the range that the five primary color gamut can represent, which grayscale values going out of the range can be cut off. Specifically, grayscale values exceeding M are replaced with M, and grayscale values below 0 are replaced with 0.

As can be seen from the above description, the image data processing module 620 receives the original image data of the image and converts the original control signal values R, G, and B of the m colors of each pixel into corresponding corrected control signal values r, g, b, rl, and gl to obtain the corrected image data, and the image data processing module 620 also provides the corrected image data to the light modulating device 630.

The light modulating device 630 is configured to receive the corrected image data and modulate the first light and the second light based on the m+n corrected control signal values r, g, b, rl, and gl of each pixel of the corrected image data so as to obtain image light.

In this embodiment, the light modulation device 630 includes a first spatial light modulator 631 and a second spatial light modulator 632. The first spatial light modulator 631 is configured to generate the first image light by modulating the corresponding color light in the first light and the second light based on k corrected control values in the m+n corrected control signal values of each pixel of the corrected image data, wherein k is smaller than m+n. The second spatial light modulator 632 is configured to generate the second image light by modulating the corresponding color light in the first light and the second light based on m+n−k corrected control values in addition to the k corrected control signal values among the m+n corrected control signal values of each pixel of the corrected image data. The first image light and the second image light generated by the light modulation device 630 can be synthesized by the image synthesizing device 640 to display the image. It should be understood that the first spatial light modulator 631 and the second spatial light modulator 632 can be DMD spatial light modulators, Lcos spatial light modulators, LCD spatial light modulators, or the like.

In an embodiment, the m can be 3, the n can be 2, the first light includes a light of the first color, a light of the second color, and a light of the third color, and the second light includes the light of the first color and the light of the second color. As described above, the corrected control signal values include the corrected control signal value r corresponding to the light of the first color in the first light, the corrected control signal value g corresponding to the light of the second color in the first light, the corrected control signal value b corresponding to the light of the third color in the first light, the corrected control signal value rl corresponding to the light of the first color in the second light, and the corrected control signal value gl corresponding to the light of the second color in the second light. The first spatial light modulator 631 is configured to modulate the light of the first color in the first light based on the corrected control signal value r corresponding to the light of the first color in the first light and modulate the light of the first color in the second light based on the corrected control signal value rl corresponding to the light of the first color in the second light, so as to generate the first image light. The second spatial light modulator 632 is configured to modulate the light of the second color in the first light based on the corrected control signal value g corresponding to the light of the second color in the first light, to modulate the light of the second color in the second light based on the corrected control signal value gl corresponding to the light of the second color in the second light, and to modulate the light of the third color in the first light based on the corrected control signal value b corresponding to the light of the third color in the first light, so as to generate the second image light. That is, the k is 2, the color lights corresponding to the k corrected control values are the light of the second color of the first light and the light of the second color of the second light. The color lights corresponding to the m+n−k corrected control values are the light of the second color of the first light, the light of the second color of the second light, and the light of the third color of the first light.

Wherein, the light of the first color, the light of the second color, and the light of the third color can be red light, green light and blue light, respectively. The light of the first color, the light of the second color, and the light of the third color in the first light are red fluorescence, green fluorescence, and blue laser light, respectively. The light of the first color and the light of the second color in the second light are red laser light and green laser light, respectively.

Figure 8:
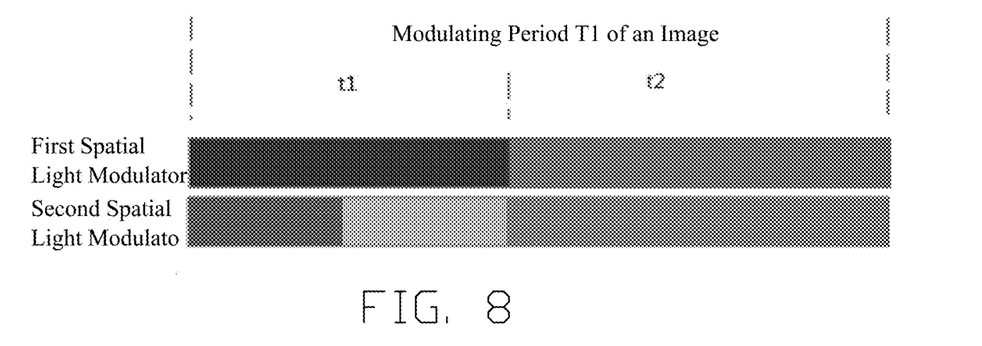
FIG. 8 is a modulation timing diagram of two spatial light modulators of the display apparatus shown in FIG. 6.

Please refer to FIG. 8, FIG. 8 is a modulation timing diagram of two spatial light modulators of the display apparatus shown in FIG. 6. A modulation time T1 of this image is divided into a first period t1 and a second period t2. The first spatial light modulator 631 is configured to modulate the light of the first color of the second light during the first period t1, and the second spatial light modulator is configured to modulate the light of the third color of the first light and the light of the second color of the second light sequentially during the first period t1. The first spatial light modulator is configured to modulate the light of the first color of the first light during the second period t2, and the second spatial light modulator is configured to modulate the light of the second color of the first light during the second period t2. In this embodiment, duration of the first period t1 can be equal to that of the second period t2. A modulation duration of the second spatial light modulator for modulating the light of the third color of the first light is equal to a modulation duration for modulating the light of the second color of the second light.

Figure 9:
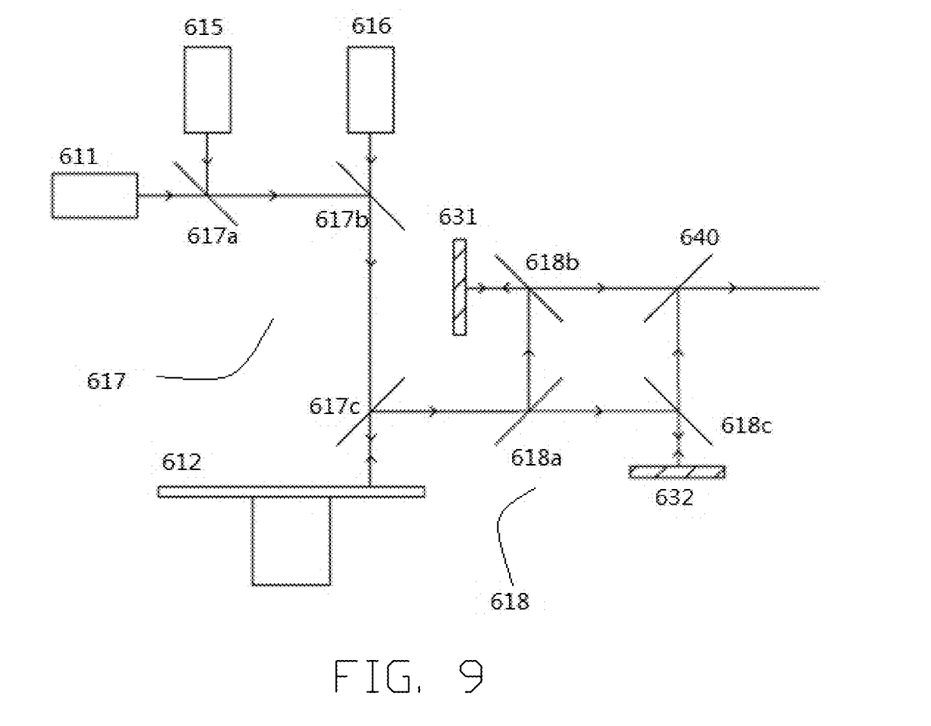
FIG. 9 is a schematic diagram of a specific structure of a part of the display apparatus shown in FIG. 6.

Please refer to FIG. 9, the FIG. 9 is a schematic diagram of a specific structure of the light source device 610, the light modulating device 630 and the image synthesizing device 640 of the display apparatus 600 shown in FIG. 6. Specifically, in the embodiment shown in FIG. 8, the light source device 610 includes a first light source 611, a second light source 612, a light-combing element 617, and a light-splitting device 618. The first light source 611 is configured to emit the first light, and the second light source 612 is configured to emit the second light. The first light source 611 includes an excitation light source 613 and a wavelength conversion device 614. The excitation light source 613 emits excitation light. The wavelength conversion device 614 has fluorescent material and is configured to receive the excitation light and emit the first light. The first light includes fluorescence, the second light source 612 includes a laser light source, and the second light includes laser light.

The excitation light source 613 is a laser light source, and the excitation light is blue laser light. The wavelength conversion device 614 is configured to receive the excitation light and convert a part of the excitation light into the fluorescence, and take another part of the excitation light and the fluorescence as the first light. The fluorescence includes red light and green light. The second light source 612 includes a first laser light source 615 and a second laser light source 616, and the second light includes first laser light and second laser light. The first laser light is red laser light and the second laser light is green laser light, or the first laser light is green laser light and the second laser light is red laser light.

The light-combining device 617 is configured to combine the first light and the second light. The light-combining device 617 includes a first light-combining element 617a, a second light-combining element 617b, and a third light-combining element 617c. The first light-combining element 617a is configured to receive the excitation light emitted from the excitation light source 613 and a first laser light emitted from the first laser light source 615 so as to combine the excitation light with the first laser light. The second light-combining element 617b is configured to combine the excitation light and the first laser light emitted from the first light-combining element 617a with a second laser light emitted from the second laser light source 616. The third light-combining element 617c is configured to guide the excitation light, the first laser light, and the second laser light which are emitted from the second light-combining element 617b to the wavelength conversion device 614. The wavelength conversion device 614 receives a part of the excitation light and generates the fluorescence and guides the fluorescence and the other part of the excitation light to the light-splitting device through the third light-combining element 617c. The wavelength conversion device 614 can also receive the first laser light and the second laser light and guide the first laser light and the second laser light to the light-splitting device 618 by the third light-combining element 617c. The first light-combining element 617a, the second light-combining element 617b, and the third light-combining element 617c can all be wavelength-combining elements, such as wavelength splitting films.

The light-splitting device 618 is configured to separate the combined light of the first light and the second light so as to guide the color light corresponding to the k corrected control values in the first light and the second light to the first spatial light modulator 631, and guide the color light corresponding to the m+n−k corrected control values in the first light and the second light to the second spatial light modulator 632. As mentioned above, the k is 2, the color lights corresponding to the k corrected control values are the light of the second color of the first light and the light of the second color of the second light. The color light corresponding to the m+n−k corrected control values are the light of the second color of the first light, the light of the second color of the second light, and the light of the third color of the first light. The light of the first color, the light of the second color, and the light of the third color can be red light, green light, and blue light in sequence. The light of the first color, the light of the second color, and the light of the third color in the first light are red fluorescence, green fluorescence and blue laser light, respectively. The light of the first color and the light of the second color in the second light are red laser light and green laser light, respectively.

The light-splitting device 618 includes a light-splitting element 618a, a first guiding element 618b, and a second guiding element 618c. The light-splitting element 618a is configured to receive the first light and the second light emitted from the light-combining device 617 and guide the color light corresponding to the k corrected control values to the first spatial light modulator 631 by the first guiding element 618b, and guide the color light corresponding to the m+n−k corrected control values to the second spatial light modulator 632 by the second guiding element 618c. The first image light generated by the first spatial light modulator 631 is also guided to the image synthesizing device 640 by the first guiding element 618b. The second image light generated by the second spatial light modulator 632 is also guided to the image synthesizing device 640 by the second guiding element 618c. The image synthesizing device 640 is configured to combine the first image light and the second image light. Wherein, the light-splitting element 618a may be a wavelength-splitting element, such as a wavelength-splitting film, which is configured to separate the color light (such as red fluorescence and red laser light) corresponding to the k corrected control values in the combined light of the first light and the second light and the color light (such as green fluorescence, green laser light and blue fluorescence) corresponding to the m+n−k corrected control values.

Figure 10:
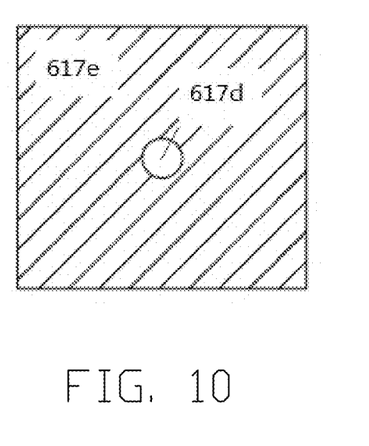
FIG. 10 is a planar view of a third light-combing element shown in FIG. 9.
Figure 11:
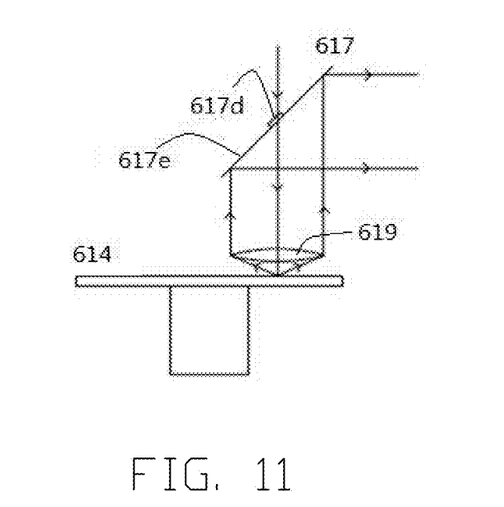
FIG. 11 is a schematic diagram of a light path when the third light-combing element shown in FIG. 9 is working.
Figure 12:
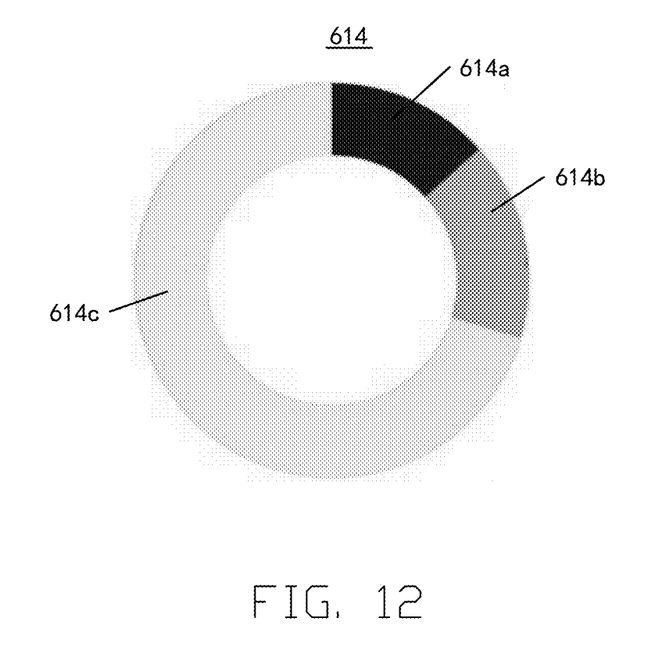
FIG. 12 is a schematic diagram of a wavelength conversion device shown in FIG. 9.

Further, please refer to FIG. 10, FIG. 11, and FIG. 12, FIG. 10 is a schematic planer view the structure of the third light-combining element 617c, FIG. 11 is schematic diagram of a light path when the third light-combining element 617c is working, and FIG. 12 is a structure diagram of the wavelength conversion device 614. In this embodiment, the third light-combining element 617c includes a first area 617d and a second area 617e. The first area 617d receives the excitation light, the first laser light and the second laser light emitted from the second light-combining element 617b, and transmits the excitation light, the first laser light and the second laser light to the wavelength conversion device 614. The first area 617d is located at the center of the second area 617e. A lens 619 can also be arranged between the wavelength conversion device 614 and the third light-combining element 617c for collimating light emitted from the wavelength conversion device 614.

The wavelength conversion device 614 includes a first segmented area 614a, a second segmented area 614b, and a third segmented area 614c which are time-sequentially arranged along a circumferential direction. The first segmented area 614a is covered with yellow fluorescent material, and the second segmented area 614b and the third segmented area 614c can be covered with reflective and scattering material, respectively. The wavelength conversion device 614 rotates in the circumferential direction during operation, so that the first segmented area 614a, the second segmented area 614b, and the third segmented area 614c are time-sequentially located on an optical path of light emitted from the third light-combining element 617c.

A period for the wavelength conversion device 614 to rotate circle is the modulating time T1 of the image. During a first half of the first period t1, the excitation light source 611 is turned on, and the first laser light source 615 is turned on. The excitation light and the first laser light are guided to the first segmented area 614a, and the first segmented area 614a reflects the excitation light and the first laser light to the second area 617e. The second area 617e reflects the excitation light and the first laser light to the light-splitting device 618. The light-splitting device 618 separates the excitation light and the first laser light, thereby guiding the excitation light (that is, the light of the third color of the first light) to the second spatial light modulator 632 and guiding the first laser light to the first spatial light modulator 631.

During the second half of the first period t1, the excitation light source 611 is turned off, the first laser light source 615 and the second laser light source 616 are turned on. The first laser light and the second laser light are guided to the second segmented area 614b. The second segmented area 614b reflects the first laser light and the second laser light to the second area 617e. The second area 617e reflects the first laser light and the second laser light to the light-splitting device 618. The light-splitting device 618 separates the first laser light and the second laser light so as to guide the excitation light (that is, the light of the second color of the first light) to the second spatial light modulator 632 and the first laser light to the first spatial light modulator 631.

During the second period t2, the excitation light source 611 is turned on, the first laser light source 615 and the second laser light source 616 are turned off, the third segmented area 614c receives the excitation light and converts the excitation light into yellow fluorescence and reflects the yellow fluorescence to the second area 617e. The second area 617e guides the yellow fluorescence to the light-splitting device 618. The light-splitting device 618 separates the yellow fluorescence to guide the light of the first color (that is, red fluorescence) of the first light and the light of the second color (that is, green fluorescence) of the first light to the first spatial light modulator 631 and the second spatial light modulator 632, respectively.

Compared with the prior art, in the display apparatus 600 of the present disclosure, the second light is added, and the original image data of the image is converted into m corrected control signal values and n corrected control signal values corresponding to the first light and the second light, respectively, and then the first light and the second light are modulated based on the m+n corrected control signal values, respectively, so as to obtain first image light and second image light, which can realize a display of image data with a wide color gamut, and can ensure an accurate reproduction of a displayed image. The display apparatus 600 has a wider color gamut and a better display effect.

Figure 13:
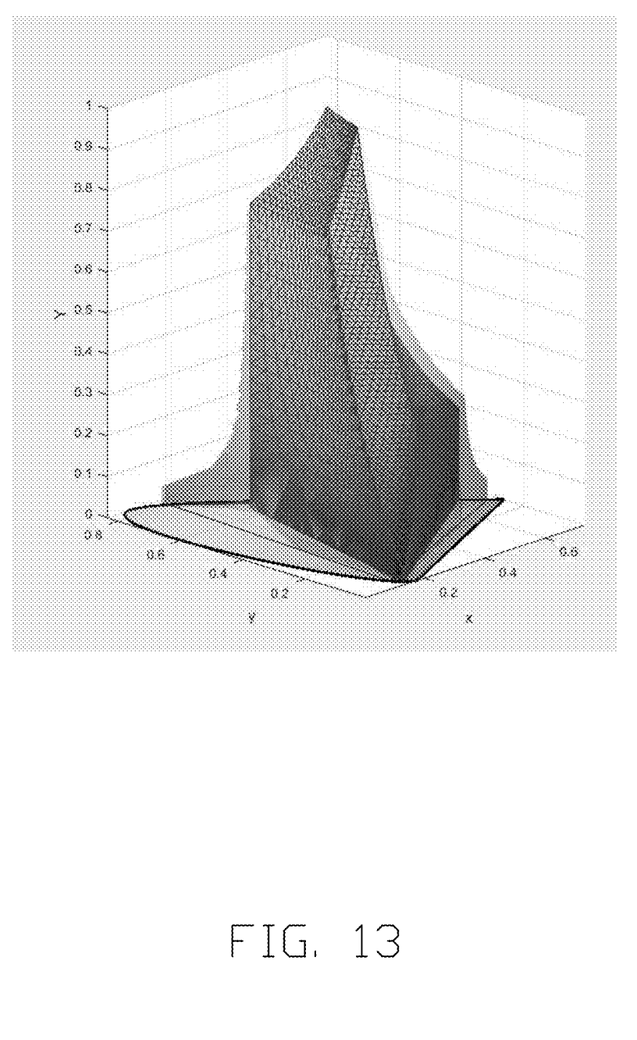
FIG. 13 is a schematic diagram of a color gamut and a color volume expansion of the display device shown in FIG. 6.

Further, it is possible to enable less use of the red laser light and the green laser light corresponding to the rl and gl by selecting values of r, g, b, rl, and gl to minimize the rl2+gl2 when calculating the corrected control signal values r, g, b, rl, and gl, thereby reducing a cost of the light source. Furthermore, with the display apparatus 600 based on the present disclosure, a small amount of red and green laser lights can be added to achieve the color gamut of REC 2020. Please refer to FIG. 13, which is a schematic diagram of the technical color gamut and color volume expansion of the display apparatus shown in FIG. 6. As shown in FIG. 13, the color gamut can be extended to the range of Rec.2020 by adding green laser light and red laser light with a proportion of 5% in brightness. An outer shaded area shown in FIG. 13 is the extended color gamut range, so the display apparatus 600 and a display apparatus adopting the display method have better display effects.

The above descriptions illustrate the various embodiments of the present invention, and do not limit the scope of the invention. Equivalent structures or processes based on the disclosure of this specification and drawings, or their direct or indirect applications in other related technology areas, are within the scope of protection of this invention.

The invention claimed is:

1. A display apparatus, comprising:
a light source device configured to emit first light and second light, wherein the first light is configured to be modulated to form images within a first color gamut range, the second light is configured to cooperate with the first light to be modulated to jointly form images outside the first color gamut range, and the first light comprises light of m colors, the second light comprises light of n colors out of the m colors, wherein m is greater than or equal to n;
an image data processing module configured to receive original image data of an image to be displayed, wherein the original image data of the image to be displayed is based on image data within a second color gamut range and comprises original control signal values of the m colors of each pixel, and the second color gamut range covers the first color gamut range and has a portion that exceeds the first color gamut range, and wherein the image data processing module is further configured to map the original control signal values of the m colors of each pixel of the original image data of the image to be displayed into corrected control signal values of m+n colors, so as to obtain corrected image data of the image to be displayed, wherein the corrected control signal values of m+n colors of each pixel in the corrected image data comprises m+n corrected control signal values corresponding to the m colors of lights of the first light and n colors of lights in the second light;
a first spatial light modulator configured to generate first image light by modulating the corresponding color light in the first light and the second light based on k corrected control values of m+n corrected control signal values of each pixel of the corrected image data, wherein k is smaller than m+n; and
a second spatial light modulator configured to generate second image light by modulating the corresponding color light in the first light and the second light based on m+n-k corrected control values other than k corrected control values in the m+n corrected control signal values of each pixel of the corrected image data.

2. The display apparatus of claim 1, wherein assuming that m is 3, n is 2, the original control signal values of the light of m colors of each pixel are R, G, and B, the corrected control signal values corresponding to the light of m colors of the first light are r, g, and b, and the corrected control signal values corresponding to the light of n colors of the second light are rl and gl, and three tristimulus values of a pixel calculated based on the original control signal values R, G, and B of the pixel equal to that calculated based on the first corrected control signal values r, g, and b of the pixel and the second corrected control signal values rl, gl of the pixel.

3. The display apparatus of claim 2, wherein the image data processing module is configured to, in calculating the corrected control signal values r, g, b, rl, and gl based on the original control signal values R, G, and B of each pixel, select values of r, g, b, rl, and gl so as to minimize $rl^2+gl^2$.

4. The display apparatus of claim 1, wherein the first light comprises light of the first color, light of the second color, and light of the third color, the second light comprises the light of the first color and the light of the second color,
the corrected control signal values comprise a corrected control signal value corresponding to the light of the first color in the first light, a corrected control signal value corresponding to the light of the second color in the first light, a corrected control signal value corresponding to the light of the third color in the first light, a corrected control signal value corresponding to the light of the first color in the second light, and a corrected control signal value corresponding to the light of the second color in the second light,
the first spatial light modulator is configured to modulate the light of the first color in the first light based on the corrected control signal value corresponding to the light of the first color in the first light and modulate the light of the first color in the second light based on the corrected control signal value corresponding to the light of the first color in the second light to generate the first image light, and the second spatial light modulator is configured to modulate the light of the second color in the first light based on the corrected control signal value corresponding to the light of the second color in the first light, to modulate the light of the second color in the second light based on the corrected control signal value corresponding to the light of the second color in the second light, and to modulate the light of the third color in the first light based on the corrected control signal value corresponding to the light of the third color in the first light to generate the second image light.

5. The display apparatus of claim 4, wherein if a modulating time T1 of the image is divided into a first period t1 and a second period t2, then the first spatial light modulator is configured to modulate the light of the first color in the second light during the first period t1, the second spatial light modulator is configured to sequentially modulate the light of the third color in the first light and the light of the second color in the second light during the first period t1, and the first spatial light modulator is configured to modulate the light of the first color in the first light during the second period t2, and the second spatial light modulator is configured to modulate the light of the second color in the first light during the second period t2.

6. The display apparatus of claim 1, wherein the first period t1 is equal to the second period t2.

7. The display apparatus of claim 1, wherein a duration of the second spatial light modulator modulating the light of the third color in the first light is equal to a duration of the second spatial light modulator modulating the light of the second color in the second light.

8. The display apparatus of claim 1, wherein the light source device comprises a first light source configured to emit the first light and a second light source configured to emit the second light, wherein the first light source comprises an excitation light source emitting excitation light and a wavelength conversion device, the wavelength conversion device having fluorescent material and being configured to receive the excitation light and emit the first light comprising fluorescence, the second light source comprises a laser light source, and the second light comprises laser light.

9. The display apparatus of claim 8, wherein the excitation light source is a laser light source, and the excitation light is blue laser light;

the wavelength conversion device is configured to receive the excitation light and convert a part of the excitation light into the fluorescence, and the other part of the excitation light and the fluorescence are used as the first light, and the fluorescence comprises red light and green light; and the second light source comprises a first laser light source and a second laser light source, the second light comprises a first laser light and a second laser light, one of the first laser light and the second laser light is a red laser light and the other is a green laser light.

10. The display apparatus of claim 1, wherein the light source device further comprises a light-combining device and a light-splitting device, the light-combining device is configured to combine the first light and the second light, the light-splitting device is configured to split the combined first light and second light so as to guide light corresponding to the k corrected control values in the first light and the second light to the first spatial light modulator, and guide light corresponding to the m+n−k corrected control values in the first light and second light to the second spatial light modulator.

11. The display apparatus of claim 10, wherein the light-combining device comprises a first light-combining element, a second light-combining element, and a third light-combining element, wherein the first light-combining element is configured to receive the excitation light emitted from the excitation light source and the first laser light emitted from the first laser light source so as to combine the excitation light and the first laser light, the second light-combining element is configured to combine the excitation light and the first laser light emitted from the first light-combining element and the second laser light emitted from the second laser light source, and the third light-combining element is configured to guide the excitation light, the first laser light and the second laser light emitted from the second light-combining element to the wavelength converting device, so that the wavelength converting device can receive a part of the excitation light to generate the fluorescence and guide the fluorescence and the other part of the excitation light to the light-splitting device by the third light-combining element, the wavelength converting device is also configured to receive the first laser light and the second laser light and guide the first laser light and the second laser light to the light-splitting device by the third light-combining element.

12. The display apparatus of claim 10, wherein the display apparatus further comprises an image synthesis device, the light-splitting device comprises a light-splitting element, a first guiding element, and a second guiding element, wherein the light-splitting element is configured to receive the first light and the second light emitted from the light-combining device and guide the color light of the k corrected control values to the first spatial light modulator by the first guiding element, and guide the color light corresponding to the m+n−k corrected control values to the second spatial light modulator by the second guiding element, the first image light generated by the first spatial light modulator is also guided to the image synthesis device by the first guiding element, and the second image light generated by the second spatial light modulator is also guided to the image synthesis device by the second guiding element, and the image synthesis device is configured to combine the first image light and the second image light.

* * * * *